US012242350B2

(12) United States Patent
Chen et al.

(10) Patent No.: US 12,242,350 B2
(45) Date of Patent: Mar. 4, 2025

(54) DISTRIBUTED SOFTWARE UPDATE BY MULTIPLE NODES

(71) Applicant: Ruckus IP Holdings LLC, Claremont, NC (US)

(72) Inventors: Hung Fu Chen, New Taipei (TW); Hao Chuang, New Taipei (TW); Chin Hou Chou, New Taipei (TW)

(73) Assignee: Ruckus IP Holdings LLC, Claremont, NC (US)

( * ) Notice: Subject to any disclaimer, the term of this patent is extended or adjusted under 35 U.S.C. 154(b) by 158 days.

(21) Appl. No.: 18/128,301

(22) Filed: Mar. 30, 2023

(65) Prior Publication Data

US 2023/0315576 A1    Oct. 5, 2023

Related U.S. Application Data

(60) Provisional application No. 63/325,738, filed on Mar. 31, 2022.

(51) Int. Cl.
*G06F 11/14* (2006.01)
*G06F 8/65* (2018.01)

(52) U.S. Cl.
CPC ............ *G06F 11/1433* (2013.01); *G06F 8/65* (2013.01); *G06F 2201/865* (2013.01)

(58) Field of Classification Search
CPC ............................... G06F 11/1433; G06F 8/65
See application file for complete search history.

(56) References Cited

U.S. PATENT DOCUMENTS

| 5,008,814 | A  | * | 4/1991 | Mathur | ..................... G06F 8/65 |
| | | | | | 717/172 |
| 6,564,371 | B1 | * | 5/2003 | Goldman | ............ G06F 11/1433 |
| | | | | | 714/E11.135 |
| 6,681,389 | B1 | * | 1/2004 | Engel | ...................... G06F 8/656 |
| | | | | | 717/173 |
| 2009/0119655 | A1 | * | 5/2009 | Quilty | .................. H04W 24/04 |
| | | | | | 717/168 |
| 2020/0241866 | A1 | * | 7/2020 | Gupta | ..................... H04L 67/34 |
| 2022/0147336 | A1 | * | 5/2022 | Joshi | ..................... H04L 41/147 |

* cited by examiner

*Primary Examiner* — Gabriel Chu
(74) *Attorney, Agent, or Firm* — Steven Stupp

(57) ABSTRACT

During operation, a controller node, in multiple nodes in a cluster, may provide to the multiple nodes a set of operations associated with an update of controller software for a controller, where at least the controller node implements the controller. Moreover, at least a first node in the multiple nodes may perform the set of operations associated with the update of the controller software. Furthermore, at least a second node in the multiple nodes may monitor the performing of the set of operations by at least the first node. When the performing of the set of operations is completed by at least the first node, the first node may terminate the performing of the set of operations by the multiple nodes. Alternatively, when a failure occurs during the update of the controller software, at least the first node or the second node may automatically recover the multiple nodes.

20 Claims, 13 Drawing Sheets

CLUSTER OPERATION FAILED.
REASON: FAILED TO PERFORM POST-UPDATE CLEANUP OPERATION
FOR MORE DETAILS PLEASE REFERENCE THE CLUSTER EVENT AT LINK
THE SYSTEM IS RESTORING THE CLUSTER. PLEASE WAIT ...

CURRENT CLUSTER OPERATION: UPDATING
    OPERATION STATUS: PREPARING TO UPDATE
    PROGRESS STATUS:
      TIME REMAINING:

FIG. 12

CLUSTER OPERATION FAILED.
REASON: FAILED TO PERFORM POST-UPDATE CLEANUP OPERATION
FOR MORE DETAILS PLEASE REFERENCE THE CLUSTER EVENT AT LINK
THE SYSTEM IS RESTORING. IT WILL TAKE A FEW MINUTES. ONCE THE SYSTEM IS
BACK, THIS PAGE WILL UPDATE AUTOMATICALLY.

CURRENT CLUSTER OPERATION: UPDATING
    OPERATION STATUS: PREPARING TO UPDATE
    PROGRESS STATUS:
      TIME REMAINING:

FIG. 13

DISTRIBUTED SOFTWARE UPDATE BY MULTIPLE NODES

CROSS REFERENCE TO RELATED APPLICATIONS

This application claims priority under 35 U.S.C. 119(e) to U.S. Provisional Application Ser. No. 63/325,738, "Distributed Software Update by Multiple Nodes," filed on Mar. 31, 2022, by Hung Fu Chen, the contents of which are herein incorporated by reference.

FIELD

The described embodiments relate to techniques for distributed update of controller software in a computer system by multiple nodes, with automatic update recovery in the event of a failure of the update or a network failure.

BACKGROUND

Many electronic devices are capable of wirelessly communicating with other electronic devices. Notably, these electronic devices can include a networking subsystem that implements a network interface for: a cellular network (UMTS, LTE, 5G Core or 5GC, etc.), a wireless local area network (e.g., a wireless network such as described in the Institute of Electrical and Electronics Engineers (IEEE) 802.11 standard or Bluetooth™ from the Bluetooth Special Interest Group of Kirkland, Washington), and/or another type of wireless network. For example, many electronic devices communicate with each other via wireless local area networks (WLANs) using an IEEE 802.11-compatible communication protocol (which is sometimes collectively referred to as 'Wi-Fi'). In a typical deployment, a Wi-Fi-based WLAN includes one or more access points (or basic service sets or BSSs) that may communicate wirelessly with each other and with other electronic devices using Wi-Fi, and that provide access to another network (such as the Internet) via IEEE 802.3 (which is sometimes referred to as 'Ethernet').

In typical enterprise Wi-Fi-based WLAN, the configuration and operation of an access point is typically managed by a controller. Moreover, software for the controller may be routinely updated. However, when there is a failure during an update of the controller software (e.g., because of an unstable network in a customer environment), a computer system or a cluster that implements the controller may be left in an unstable state or an error state, and thus may not be able to perform the controller functions. Often, when this occurs, the only recourse is to trigger a manual restore of the computer system, which can result in significant downtime before the controller is recovered.

SUMMARY

A computer system that performs a distributed update of controller software for a controller of a network is described. This computer system may include multiple nodes in a cluster. During operation, a controller node, in the multiple nodes, provides, to the multiple nodes, a set of operations associated with the update of the controller software, where at least the controller node implements the controller. Moreover, at least a first node in the multiple nodes performs the set of operations associated with the update of the controller software. Furthermore, at least a second node in the multiple nodes monitors the performing of the set of operations by at least the first node. When the performing of the set of operations is completed by at least the first node, the first node terminates the performing of the set of operations by the multiple nodes. Alternatively, when a failure occurs during the update of the controller software, at least the first node or the second node automatically recovers the multiple nodes.

Note that at least an operation in the set of operations may be performed independently by the multiple nodes. For example, at least the operation may be performed sequentially by the multiple nodes. Alternatively, at least the operation may be performed concurrently by the multiple nodes.

Moreover, the first node may operate as a leader node in the multiple nodes. Alternatively, the second node may operate as the leader node. Note that the leader node may automatically performs the recovering when the failure occurs. Furthermore, the second node may perform the set of operations after the first node completes performing the set of operations. Additionally, the computer system may include multiple groups of nodes, where a given group of nodes has an associated instance of the leader node that automatically performs the recovering of the given group when the failure occurs.

In some embodiments, the monitoring may involve receiving, from at least the first node, a completion message when a given operation in the set of operations is completed. Additionally, when the completion message is received, at least the second node may skip performing the given operation in the set of operations. Alternatively, when the completion message is not received within a predefined time interval, at least the second node may terminate the performing of the set of operations by the multiple nodes. Then, at least the second node may automatically recover the multiple nodes. For example, the completion message may not be received within the predefined time interval when there is a network failure. In some embodiments, when there is a network failure, at least the first node and the second node may automatically recover the multiple nodes.

Moreover, when a given operation in the set of operations performed by the first node fails, the first node may notify at least the second node. In response, at least the second node may skip performing operations following the given operation in the set of operations. Next, the first node may automatically recover the multiple nodes.

Note that the recovering may include: installing a backup image of the controller software on the multiple nodes; and restoring operation of the multiple nodes.

Furthermore, when the second node determines that a connection with a third node in the multiple nodes is unavailable when the first node is performing the set of operations, the second node may terminate the performing of the set of operations by the multiple nodes. Then, at least the first node may automatically recover the multiple nodes.

Additionally, the set of operations may include: preparing the update; migrating a database; preparing the computer system for the update; upgrading the computer system; and performing post-update operations.

Another embodiment provides a node (such as a computer) that performs the at least some of the aforementioned operations in one or more of the preceding embodiments.

Another embodiment provides a computer-readable storage medium with program instructions for use with the node or the computer system. When executed by the node or the computer system, the program instructions cause the node or the computer system to perform at least some of the aforementioned operations in one or more of the preceding embodiments.

Another embodiment provides a method, which may be performed by the node or the computer system. This method includes at least some of the aforementioned operations in one or more of the preceding embodiments.

This Summary is provided for purposes of illustrating some exemplary embodiments, so as to provide a basic understanding of some aspects of the subject matter described herein. Accordingly, it will be appreciated that the above-described features are examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE FIGURES

FIG. 12 is a drawing illustrating an example of a user interface in accordance with an embodiment of the present disclosure.

FIG. 13 is a drawing illustrating an example of a user interface in accordance with an embodiment of the present disclosure.

Note that like reference numerals refer to corresponding parts throughout the drawings. Moreover, multiple instances of the same part are designated by a common prefix separated from an instance number by a dash.

DETAILED DESCRIPTION

Figure 1:
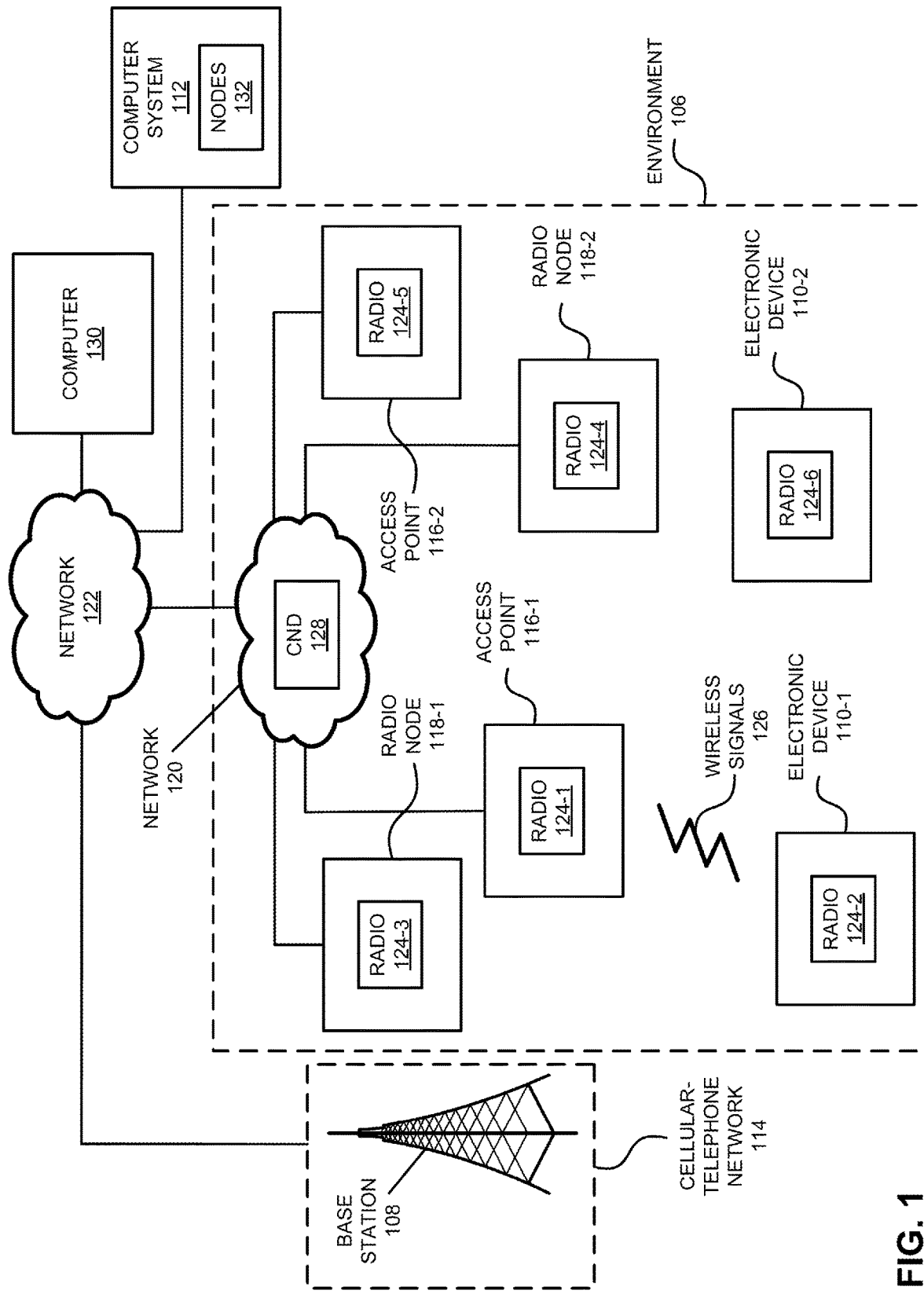
FIG. 1 is a block diagram illustrating an example of communication among electronic devices in accordance with an embodiment of the present disclosure.

A computer system that performs a distributed update of controller software for a controller of a network is described. During operation, a controller node, in multiple nodes in a cluster, may provide to the multiple nodes a set of operations associated with the update of the controller software, where at least the controller node implements the controller. Moreover, at least a first node in the multiple nodes may perform the set of operations associated with the update of the controller software. Furthermore, at least a second node in the multiple nodes may monitor the performing of the set of operations by at least the first node. When the performing of the set of operations is completed by at least the first node, the first node may terminate the performing of the set of operations by the multiple nodes. Alternatively, when a failure occurs during the update of the controller software, at least the first node or the second node may automatically recover the multiple nodes.

By performing the distributed update, these update techniques may ensure that the update process is more robust. Notably, the computer system may detect when a failure occurs during the update, and then may automatically take corrective action. For example, the computer system may automatically recover the multiple nodes by: installing a backup image of the controller software on the multiple nodes; and restoring operation of the multiple nodes. Consequently, the update techniques may reduce or eliminate occurrences of an unstable state or an error state, and may eliminate the need for a manual restore or reboot of the computer system. These capabilities may reduce or eliminate downtime of the controller associated with the update. Therefore, the update techniques may improve the user experience when updating the controller.

In the discussion that follows, electronic devices or components in a system communicate packets in accordance with a wireless communication protocol, such as: a wireless communication protocol that is compatible with an IEEE 802.11 standard (which is sometimes referred to as WiFi®, from the Wi-Fi Alliance of Austin, Texas), Bluetooth or Bluetooth low energy (BLE), an IEEE 802.15.4 standard (which is sometimes referred to as Zigbee), a cellular-telephone network or data network communication protocol (such as a third generation or 3G communication protocol, a fourth generation or 4G communication protocol, e.g., Long Term Evolution or LTE (from the 3rd Generation Partnership Project of Sophia Antipolis, Valbonne, France), LTE Advanced or LTE-A, a fifth generation or 5G communication protocol, or other present or future developed advanced cellular communication protocol), and/or another type of wireless interface (such as another wireless-local-area-network interface). For example, an IEEE 802.11 standard may include one or more of: IEEE 802.11a, IEEE 802.11b, IEEE 802.11g, IEEE 802.11-2007, IEEE 802.11n, IEEE 802.11-2012, IEEE 802.11-2016, IEEE 802.11ac, IEEE 802.11ax, IEEE 802.11ba, IEEE 802.11be, or other present or future developed IEEE 802.11 technologies. Moreover, an access point, a radio node, a base station or a switch in the wireless network may communicate with a local or remotely located computer or computer system (such as a controller) using a wired communication protocol, such as a wired communication protocol that is compatible with an IEEE 802.3 standard (which is sometimes referred to as 'Ethernet'), e.g., an Ethernet II standard. However, a wide variety of communication protocols may be used in the system, including wired and/or wireless communication. In the discussion that follows, Wi-Fi and Ethernet are used as illustrative examples.

We now describe some embodiments of the update techniques. FIG. 1 presents a block diagram illustrating an example of communication in an environment 106 with one or more electronic devices 110 (such as cellular telephones, portable electronic devices, stations or clients, another type of electronic device, etc., which are sometimes referred to as 'end devices') via a cellular-telephone network 114 (which may include a base station 108), one or more access points 116 (which may communicate using Wi-Fi) in a WLAN and/or one or more radio nodes 118 (which may communicate using LTE) in a small-scale network (such as a small cell). For example, the one or more radio nodes 118 may include: an Evolved Node B (eNodeB), a Universal Mobile Telecommunications System (UMTS) NodeB and radio network controller (RNC), a New Radio (NR) gNB or gNodeB (which communicates with a network with a cellular-telephone communication protocol that is other than LTE), etc. In the discussion that follows, an access point, a radio node or a base station are sometimes referred to generically as a 'communication device.' Moreover, one or more base stations (such as base station 108), access points 116, and/or radio nodes 118 may be included in one or more wireless networks, such as: a WLAN, a small cell, and/or a cellular-telephone network. In some embodiments, access points 116 may include a physical access point and/or a virtual access point that is implemented in software in an environment of an electronic device or a computer.

Note that access points 116 and/or radio nodes 118 may communicate with each other and/or controller (which may be a local or a cloud-based controller that manages and/or configures access points 116, radio nodes 118 and/or a computer network device (CND) 128, or that provides cloud-based storage and/or analytical services) using a wired communication protocol (such as Ethernet) via network 120 and/or 122. This controller may be implemented by a computer system 112, which may include one or more computers. For example, computer system 112 may include a cluster with multiple computers (which are sometimes referred to as multiple 'nodes' 132). However, in some embodiments, access points 116 and/or radio nodes 118 may communicate with each other and/or the controller using wireless communication (e.g., one of access points 116 may be a mesh access point in a mesh network). Note that networks 120 and 122 may be the same or different networks. For example, networks 120 and/or 122 may an LAN, an intra-net or the Internet. In some embodiments, network 120 may include one or more routers and/or switches (such as computer network device 128).

Figure 15:
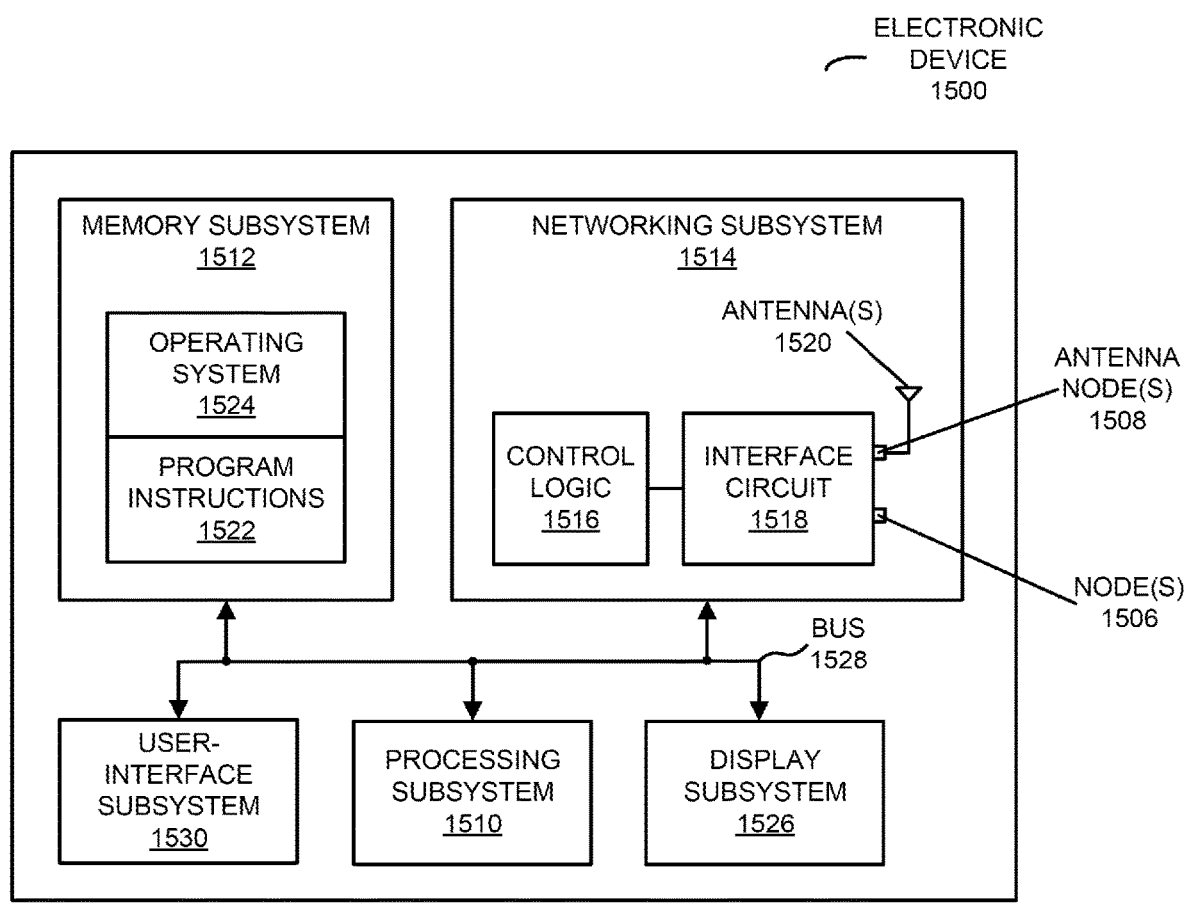
FIG. 15 is a block diagram illustrating an example of an electronic device in accordance with an embodiment of the present disclosure.

As described further below with reference to FIG. 15, electronic devices 110, computer system 112, access points 116, radio nodes 118 and computer network device 128 may include subsystems, such as a networking subsystem, a memory subsystem and a processor subsystem. In addition, electronic devices 110, access points 116 and radio nodes 118 may include radios 124 in the networking subsystems. More generally, electronic devices 110, access points 116 and radio nodes 118 can include (or can be included within) any electronic devices with the networking subsystems that enable electronic devices 110, access points 116 and radio nodes 118 to wirelessly communicate with one or more other electronic devices. This wireless communication can comprise transmitting access on wireless channels to enable electronic devices to make initial contact with or detect each other, followed by exchanging subsequent data/management frames (such as connection requests and responses) to establish a connection, configure security options, transmit and receive frames or packets via the connection, etc.

During the communication in FIG. 1, access points 116 and/or radio nodes 118 and electronic devices 110 may wired or wirelessly communicate while: transmitting access requests and receiving access responses on wireless channels, detecting one another by scanning wireless channels, establishing connections (for example, by transmitting connection requests and receiving connection responses), and/or transmitting and receiving frames or packets (which may include information as payloads).

As can be seen in FIG. 1, wireless signals 126 (represented by a jagged line) may be transmitted by radios 124 in, e.g., access points 116 and/or radio nodes 118 and electronic devices 110. For example, radio 124-1 in access point 116-1 may transmit information (such as one or more packets or frames) using wireless signals 126. These wireless signals are received by radios 124 in one or more other electronic devices (such as radio 124-2 in electronic device 110-1). This may allow access point 116-1 to communicate information to other access points 116 and/or electronic device 110-1. Note that wireless signals 126 may convey one or more packets or frames.

In the described embodiments, processing a packet or a frame in access points 116 and/or radio nodes 118 and electronic devices 110 may include: receiving the wireless signals with the packet or the frame; decoding/extracting the packet or the frame from the received wireless signals to acquire the packet or the frame; and processing the packet or the frame to determine information contained in the payload of the packet or the frame.

Note that the wireless communication in FIG. 1 may be characterized by a variety of performance metrics, such as: a data rate for successful communication (which is sometimes referred to as 'throughput'), an error rate (such as a retry or resend rate), a mean-squared error of equalized signals relative to an equalization target, intersymbol interference, multipath interference, a signal-to-noise ratio, a width of an eye pattern, a ratio of number of bytes successfully communicated during a time interval (such as 1-10 s) to an estimated maximum number of bytes that can be communicated in the time interval (the latter of which is sometimes referred to as the 'capacity' of a communication channel or link), and/or a ratio of an actual data rate to an estimated data rate (which is sometimes referred to as 'utilization'). While instances of radios 124 are shown in components in FIG. 1, one or more of these instances may be different from the other instances of radios 124.

In some embodiments, wireless communication between components in FIG. 1 uses one or more bands of frequencies, such as: 900 MHz, 2.4 GHz, 5 GHz, 6 GHz, 7 GHz, 60 GHz, the Citizens Broadband Radio Spectrum or CBRS (e.g., a frequency band near 3.5 GHz), and/or a band of frequencies used by LTE or another cellular-telephone communication protocol or a data communication protocol. Note that the communication between electronic devices may use multi-user transmission (such as orthogonal frequency division multiple access or OFDMA) and/or multiple-input multiple-output (MIMO).

Although we describe the network environment shown in FIG. 1 as an example, in alternative embodiments, different numbers or types of electronic devices may be present. For example, some embodiments comprise more or fewer electronic devices. As another example, in another embodiment, different electronic devices are transmitting and/or receiving packets or frames.

As discussed previously, a failure during an update of controller software for a controller can result in an unstable state or an error state, and may require manual restoring or rebooting of the controller. Moreover, a failure during the update can result in significant downtime of the controller.

In order to address these problems, as discussed below with reference to FIGS. 2-14, computer system 112 may implement the update techniques. Notably, a controller node in the multiple nodes 132 in computer system 112 may receive a software update from computer 130, where at least the controller node implements the controller. This software update may include or may be associated with a set of operations. For example, the set of operations may include: preparing the update; migrating a database; preparing computer system 112 for the update; upgrading computer system 112; and performing post-update operations. In some embodiments, computer system 112 may include up to four nodes 132.

After receiving the software update, the controller node may provide, to the multiple nodes 132, the set of operations. Moreover, at least a first node in the multiple nodes 132 may perform the set of operations associated with the update of the controller software. Note that at least an operation in the set of operations may be performed independently by the multiple nodes 132. For example, at least the operation may be performed sequentially by the multiple nodes 132. Alternatively, at least the operation may be performed concurrently by the multiple nodes 132.

Furthermore, at least a second node in the multiple nodes 132 may monitor the performing of the set of operations by at least the first node. When the performing of the set of operations is completed by at least the first node, the first node may terminate the performing of the set of operations by the multiple nodes 132. Alternatively, when a failure occurs during the update of the controller software, at least the first node or the second node may automatically recover the multiple nodes 132. Note that the recovering may include: installing a backup image of the controller software on the multiple nodes 132; and restoring operation of the multiple nodes 132.

For example, the monitoring may involve receiving, from at least the first node, a completion message when a given operation in the set of operations is completed. Additionally, when the completion message is received, at least the second node may skip performing the given operation in the set of operations. Alternatively, when the completion message is not received within a predefined time interval (such as 30 s or 1, 3, or 10 min), at least the second node may terminate the performing of the set of operations by the multiple nodes 132. Then, at least the second node may automatically recover the multiple nodes 132. Note that the completion message may not be received within the predefined time interval when there is a network failure. In some embodiments, when there is a network failure, at least the first node and the second node may automatically recover the multiple nodes 132.

Furthermore, when a given operation in the set of operations performed by the first node fails, the first node may notify at least the second node. In response, at least the second node may skip performing operations following the given operation in the set of operations. Next, the first node may automatically recover the multiple nodes 132.

Additionally, when the second node determines that a connection with a third node in the multiple nodes 132 is unavailable when the first node is performing the set of operations, the second node may terminate the performing of the set of operations by the multiple nodes 132. Then, at least the first node may automatically recover the multiple nodes 132.

In some embodiments, the first node may operate as a leader node in the multiple nodes 132. Alternatively, the second node may operate as the leader node. Note that the leader node may automatically performs the recovering when the failure occurs. Additionally, computer system 112 may include multiple groups of nodes, where a given group of nodes has an associated instance of the leader node that automatically performs the recovering of the given group when the failure occurs.

Note that, at the beginning of update process, nodes are connected, and one of them may be selected as the leader node. For example, the leader node may be selected by software executing on one or more of the nodes, and may be based at least in part on a timestamp when a node was setup, crashed or rebooted (such as the node with the minimum timestamp may be selected as the leader node). Thus, in a group with three nodes, where node A has timestamp 3333, node B has timestamp 2222 and node C has timestamp 1111, node C may be selected as the leader node. Moreover, as the set of operations are processed, the connections to the nodes may be maintained or the operations may fail. Furthermore, during the update process, if there is network connection failure that separates the nodes into two groups, a first one of the nodes in a first group may be selected as a leader node for the first group, and a second one of the nodes may be selected as a leader node for the second group. Thus, each group may have a leader node. For example, when the aforementioned group is separated into a first group with nodes A and B, and a second group with node C, node B may be selected as the leader node in the first group and node C may be selected as the leader node in the second group. Additionally, when a failure occurs, the leader node may recover the nodes back to the previous version of the software (such as a backup image).

In these ways, the update techniques may ensure that the update process is more robust. Notably, computer system 112 may detect when a failure occurs during the update, and then may automatically take corrective action by restoring the multiple nodes 132 to a state prior to the update or to a known state (such as a state associated with a previous version of the controller software). Consequently, the update techniques may reduce or eliminate occurrences of an unstable state or an error state, and may eliminate the need for a manual restore or reboot of computer system 112. These capabilities may reduce or eliminate downtime of the controller associated with the update. Therefore, the update techniques may improve the user experience when updating the controller software.

While FIG. 1 illustrates a distributed update of the controller software for the controller of the network, in some embodiments one or more of the operations in the set of operations may be performed in a centralized manner. Moreover, while FIG. 1 illustrates computer system 112 performing the update of the controller software for the controller of the network, in other embodiments one or more of the operations in the set of operations may be performed remotely, e.g., by a computer or a computer system located at or near a customer premises, such as in or associated with environment 106. Furthermore, while the present discussion illustrates the update techniques with an update to controller software, more generally the update techniques may be used with an arbitrary software update for an arbitrary electronic device (which may include a type of electronic device that is not a controller).

Figure 2:
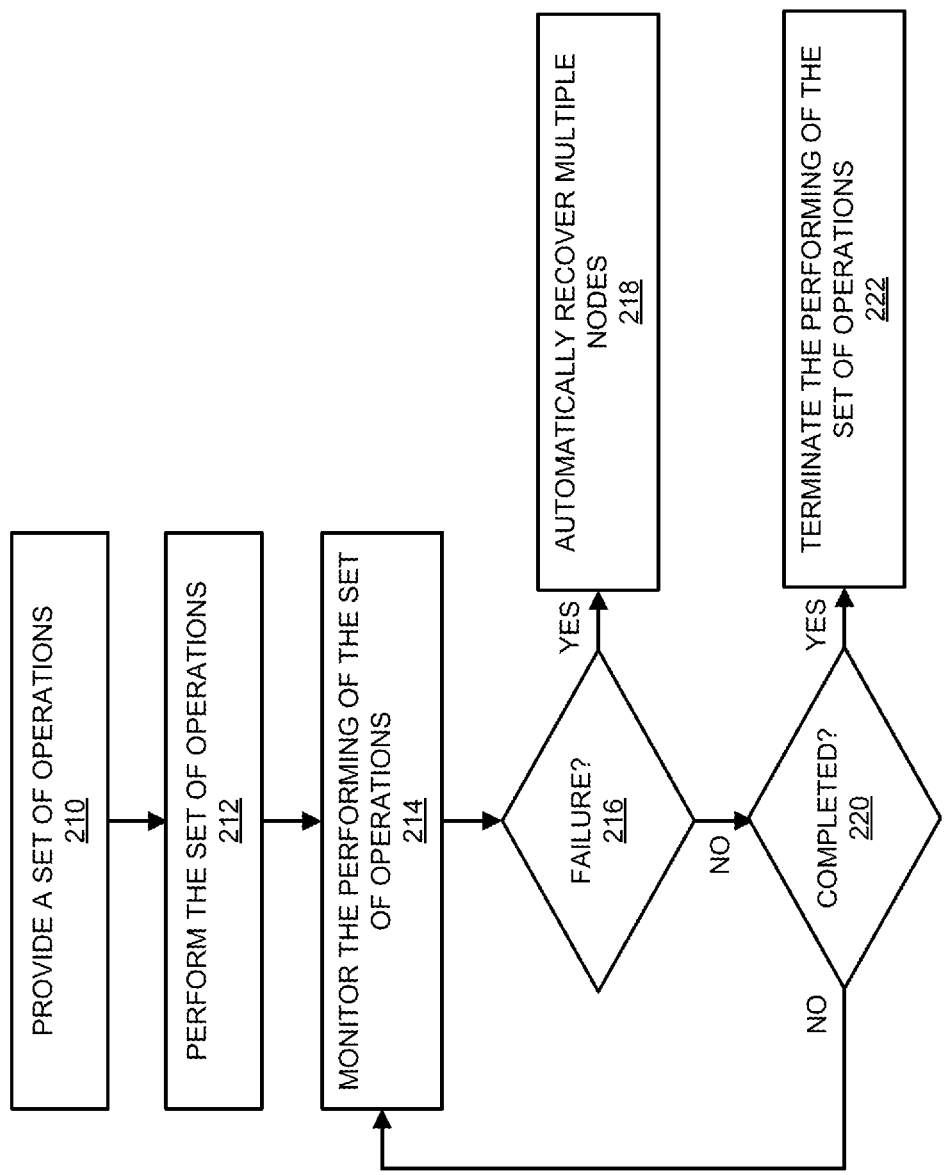
FIG. 2 is a flow diagram illustrating an example of a method for updating controller software using multiple nodes in a computer system in FIG. 1 in accordance with an embodiment of the present disclosure.

We now describe embodiments of the method. FIG. 2 presents a flow diagram illustrating an example of a method 200 for updating controller software, which may be performed by multiple nodes in a computer system (such as computer system 112 in FIG. 1). During operation, a controller node, in multiple nodes in a cluster in the computer system, may provide, to the multiple nodes, a set of operations (operation 210) associated with the update of the controller software, where at least the controller node implements a controller of a network. For example, the set of operations may include: preparing the update; migrating a database; preparing the computer system for the update; upgrading the computer system; and performing post-update operations. Moreover, at least a first node in the multiple nodes may perform the set of operations (operation 212) associated with the update of the controller software. Furthermore, at least a second node in the multiple nodes may monitor (operation 214) the performing of the set of operations by at least the first node. When a failure occurs (operation 216) during the update of the controller software, at least the first node or the second node may automatically recover the multiple nodes (operation 218), where the recovering may include: installing a backup image of the controller software on the multiple nodes; and restoring operation of the multiple nodes. Alternatively, when the performing of the set of operations is completed (operation 220) by at least the first node, the first node may terminate the performing of the set of operations (operation 222) by the multiple nodes. Otherwise, the computer system may continue the monitoring (operation 214).

Note that at least an operation in the set of operations may be performed independently by the multiple nodes. For example, at least the operation may be performed sequentially by the multiple nodes. Alternatively, at least the operation may be performed concurrently by the multiple nodes.

Moreover, the first node may operate as a leader node in the multiple nodes. Alternatively, the second node may operate as the leader node. Note that the leader node may automatically performs the recovering when the failure occurs. Additionally, the computer system may include multiple groups of nodes, where a given group of nodes has an associated instance of the leader node that automatically performs the recovering of the given group when the failure occurs.

In some embodiments, the monitoring (operation 214) may involve receiving, from at least the first node, a completion message when a given operation in the set of operations is completed. Additionally, when the completion message is received, at least the second node may skip performing the given operation in the set of operations. Alternatively, when the completion message is not received within a predefined time interval, at least the second node may terminate the performing of the set of operations by the multiple nodes. Then, at least the second node may automatically recover the multiple nodes. For example, the completion message may not be received within the predefined time interval when there is a network failure. In some embodiments, when there is a network failure, at least the first node and the second node may automatically recover the multiple nodes.

Moreover, when a given operation in the set of operations performed by the first node fails, the first node may notify at least the second node. In response, at least the second node may skip performing operations following the given operation in the set of operations. Next, the first node may automatically recover the multiple nodes.

Furthermore, when the second node determines that a connection with a third node in the multiple nodes is unavailable when the first node is performing the set of operations (operation 212), the second node may terminate the performing of the set of operations by the multiple nodes. Then, at least the first node may automatically recover the multiple nodes.

In some embodiments of method 200, there may be additional or fewer operations. Furthermore, the order of the operations may be changed, and/or two or more operations may be combined into a single operation.

Figure 3:
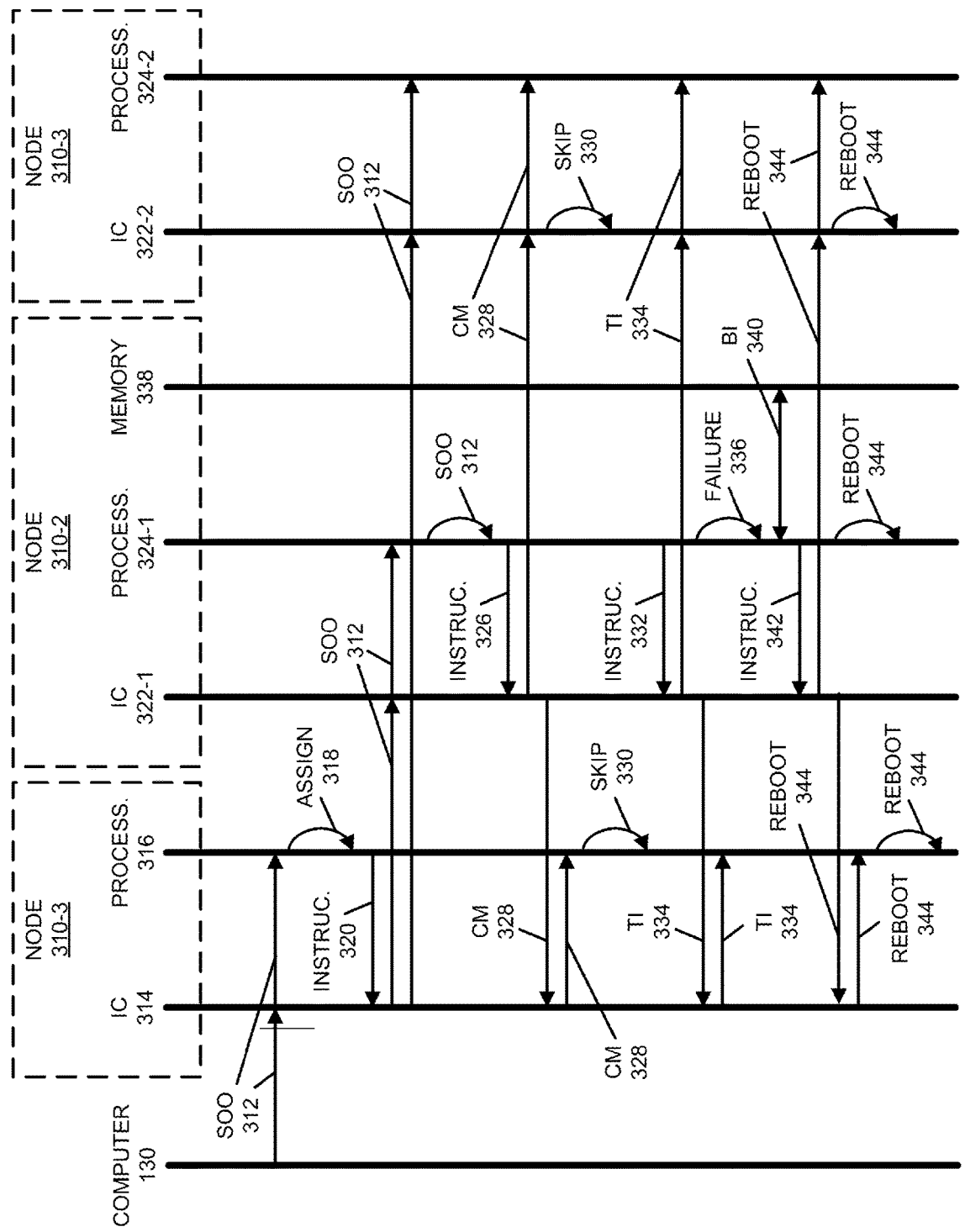
FIG. 3 is a drawing illustrating an example of communication between nodes in a computer system in FIG. 1 in accordance with an embodiment of the present disclosure.

Embodiments of the update techniques are further illustrated in FIG. 3, which presents a drawing illustrating an example of communication between multiple nodes 310 in a cluster in computer system 112 and computer 130. In FIG. 3, an interface circuit in computer 130 may provide a set of operations (SOO) 312 associated with an update to controller software of a controller of a network to a controller node (such as node 310-1) in computer system 112, where at least the controller node implements the controller.

After receiving the set of operations 312, an interface circuit 314 in node 310-1 may provide the set of operations 312 to a processor 316 in node 310-1. Then, processor 316 may assign 318 the set of operations 312 to nodes 310. Next, processor 316 may instruct 320 interface circuit 314 to provide the set of operations 312 to nodes 310, such as node 310-2 and node 310-3.

Moreover, after receiving the set of operations 312, interface circuits 322 in node 310-2 and 310-2 may provide the set of operations 312 to processors 324 in node 310-2 and 310-3. Then, processor 324-1 in node 310-2 may perform the set of operations 312. When one or more operations in the set of operations 312 is completed, processor 324-1 may instruct 326 interface circuit 322-1 in node 310-2 to provide confirmation messages (CM) 328 to node 310-1 and node 310-3.

In some embodiments, after receiving a given one of confirmation messages 328, an interface circuit 322-2 in node 310-3 may provide the given one of confirmation messages 328 to processor 324-2 in node 310-3. In response, processor 324-2 may skip 330 perform the completed operation(s). Similarly, after receiving a given one of confirmation messages 328, interface circuit 314 may provide the given one of confirmation messages 328 to processor 316. In response, processor 316 may skip 330 perform the completed operation(s)

Furthermore, when the performing of the set of operations 312 is completed by at least node processor 324-1, processor 324-1 may terminate the performing of the set of operations 312 by nodes 310. For example, processor 324-1 may instruct 332 interface circuit 322-1 to provide a termination instruction (TI) 334 to node 310-1 and node 310-3, which are then forwarded to processor 316 and processor 324-2, respectively.

Alternatively, when a failure occurs during the update of the controller software, at least processor 324-1 or processor 324-2 may automatically recover nodes 310. For example, when failure 336 occurs, processor 324-1 may access a backup image (BI) 340 of the controller software on nodes 310 in memory 338 in node 310-2. Then, processor 324-1 may instruct 342 interface circuit 322-1 to provide backup image 340 to node 310-1 and node 310-3 and to restore operation of nodes 310 (e.g., by providing a reboot 344 instruction or command to node 310-1 and node 310-3).

After receiving backup image 340 and the reboot 344 instruction or command, a given node (such as node 310-1, 310-2 or 310-3) may install backup image 340 and may perform the reboot 344 instruction or command. For example, interface circuit 322-2 may provide backup image 340 and the reboot 344 instruction or command to processor 324-2. Then, processor 324-2 may install backup image 340 and may perform the reboot 344 instruction or command.

While FIG. 3 illustrates communication between components using unidirectional or bidirectional communication with lines having single arrows or double arrows, in general the communication in a given operation in this figure may involve unidirectional or bidirectional communication. Moreover, while FIG. 3 illustrates operations being performed sequentially or at different times, in other embodiments at least some of these operations may, at least in part, be performed concurrently or in parallel.

We now further describe the update techniques. Notably, the update techniques may provide a decentralized update process with automatic recovery. In many existing update techniques, when an update fails (e.g., because of an unstable network in an environment associated with a customer), a computer system may be left in an unstable state and may be unable to provide service to a customer. When this occurs, a user may have no alternative besides manually triggering a cluster restore in order to bring the cluster back to in-service again. However, there may be a long recovery time for the computer system. Ideally, the downtime should be small to reduce the impact. The disclosed update techniques may provide a more stable process flow.

In the disclosed update techniques, a computer system may automatically trigger a recovery operation to restore the computer system to in-service when it has an update failure. Notably, the update techniques may define a failure point and a flow for an update agent to handle the automatic recovery. Moreover, the computer system may continue the update process when a network is unavailable for less than a predefined time interval (thus, the update techniques may provide network fault tolerance).

In some embodiments, iterations (operations) associated with an update to the controller software may include: defining a failure point; defining a recovery operation; an update flow; a user-interface change; and/or defining events. For example, a first iteration may prepare the update (such as by modifying an ES minimum master node to no fail). Moreover, a second iteration may migrate a database. This may include: updating a schema (which may throw an exception when there is a failure); data validation (where an exception is captured); update data (where an exception is captured); and/or certified migration of a leader node (which may throw an exception when there is a failure). Furthermore, a third iteration may prepare the computer system (such as installing a binary, which may throw an exception when there is a failure; and/or certified migration of a follower, which may throw an exception when there is a failure). Additionally, a fourth iteration may update the computer system (such as rebooting the computer system, which may throw an exception when there is a failure). In some embodiments, a fifth iteration may perform post-updates to the computer system. This may include: a configuration file migration (which may throw an exception when there is a failure); a switch migration (where an exception may be captured); and ES re-index (where an exception may be captured); and/or a general computer-network-device configuration (where an exception may be captured).

Note that a failure point definition may include: when a processor fails to execute an iteration; when a controller fails to dispatch an iteration to processors in a cluster (e.g., because of a network issue); when a processor fails to respond with an iteration complement (such as an acknowledgment) to controller (e.g., because of a network issue); a timeout of processing an iteration by a processor; and/or a timeout for receiving a response iteration complement by a controller (e.g., because of a network issue). When a failure occurs, the recovery operation may include: restoring an original version of an image from a backup file; and/or stopping the update operation and resuming in-service operation of the cluster. Note that the recovery operation may be performed when there is a failure for any of the iterations.

During the update techniques, processor in a given node may individually process some or all of the iterations from controller node. This may allow the processor to: implement automatic recovery; ensure that remote procedures are not interrupted by a network issue (because the iterations are assigned by the controller node at the beginning of the update techniques); ensure that there is not a controller left issue (because the iterations are assigned by the controller node at the beginning of the update techniques); ensure that there is no need to handover the controller role when a reboot operation is performed (because the iterations are assigned by the controller at the beginning of the update techniques); ensure that there will not be a failure to respond to a completion or failure message (e.g., the leader node may update a shared map); use the shared map to synchronize state when nodes are separate by network for a brief time interval (such as when there network is unavailable for less than the predefined time interval); and/or ensure that each of the nodes in cluster has or maintains an iterations process state (which may facilitate debugging).

Figure 4:
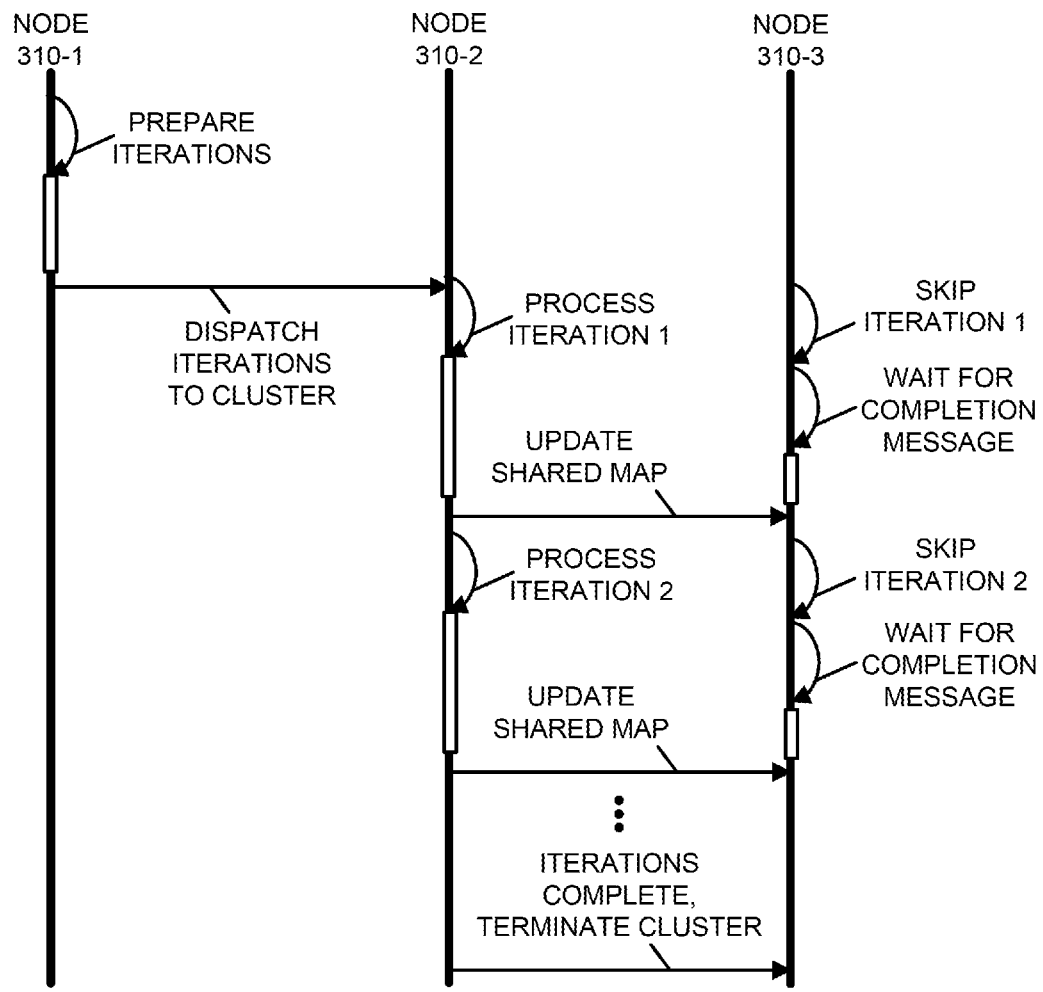
FIG. 4 is a drawing illustrating an example of communication between nodes in a computer system in FIG. 1 in accordance with an embodiment of the present disclosure.

A successful execution of an update to the controller software is shown in FIG. 4, which presents a drawing illustrating an example of communication between nodes 310 in computer system 112. Note that while node 310-1 functions or operates as the controller node, all of nodes 310 may, in principle, perform the set of operations (or the iterations) in or associated with the update to the controller software. The controller node prepares the iterations (or sets of operations) for the different nodes 310. These iterations are then provided to the processors in nodes 310. In FIG. 4, node 310-2 may be the leader node.

In general, nodes 310 may process the iterations independently. For example, at least some of the iterations may be processed serially by nodes 310 or in parallel (such as concurrently or collaboratively) by nodes 310. In some embodiments, one or more of the iterations may not be performed by all of nodes 310. Note that nodes 310 may share information (such as results) of performing the iterations with each other (e.g., via updates to the shared map).

As shown in FIG. 4, when a given iteration is successfully performed by node 310-2, this iteration may be skipped by node 310-3 (as well as the remaining nodes in nodes 310).

Note that he distributed update architecture may provide decentralized processing of the update to the controller software. Consequently, when the network coupling nodes 310 is down or is unavailable, nodes 310 may wait (e.g., up to a predefined time interval, such as 30 s or 1, 3, 5 or 10 min.) until the network is available again to process the remaining iterations.

Figure 5:
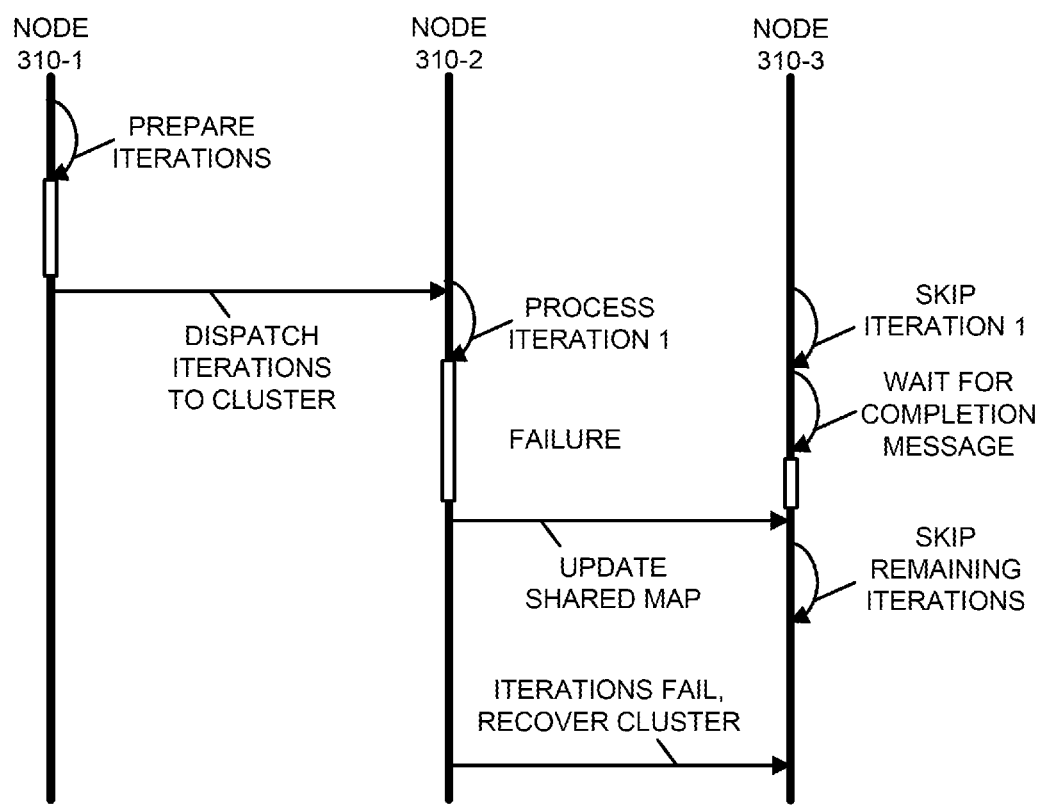
FIG. 5 is a drawing illustrating an example of communication between nodes in a computer system in FIG. 1 in accordance with an embodiment of the present disclosure.

Moreover, as shown in FIG. 5, which presents a drawing illustrating an example of communication between nodes 310 in computer system 112, when an iteration performed by node 310-2 fails, the leader node (such as node 310-2) may restore a previous version of the controller software (e.g., by providing instructions to the remaining or other nodes in nodes 310).

Figure 6:
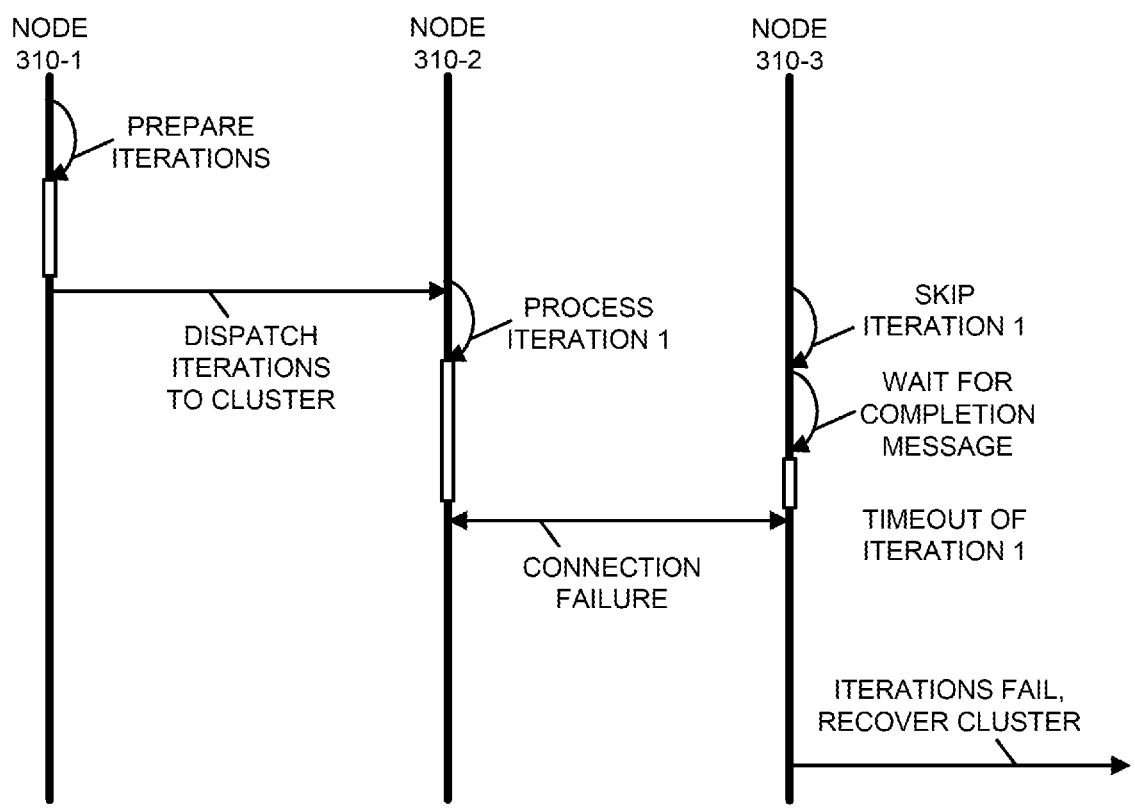
FIG. 6 is a drawing illustrating an example of communication between nodes in a computer system in FIG. 1 in accordance with an embodiment of the present disclosure.

Furthermore, as shown in FIG. 6, which presents a drawing illustrating an example of communication between nodes 310 in computer system 112, when node 310-2 cannot provide update information (such as an update to a success state) to the leader node, e.g., node 310-3, and one or more of nodes 310 (such as node 310-3) reaches a predefined time out (such as the predefined time interval), the update may fail. In this case, at least node 310-3 (which may be the leader node) may handle the automatic recovery of nodes 310. Alternatively, in some embodiments all of nodes 310 may be become leader nodes and may handle the automatic recovery of nodes 310.

Figure 7:
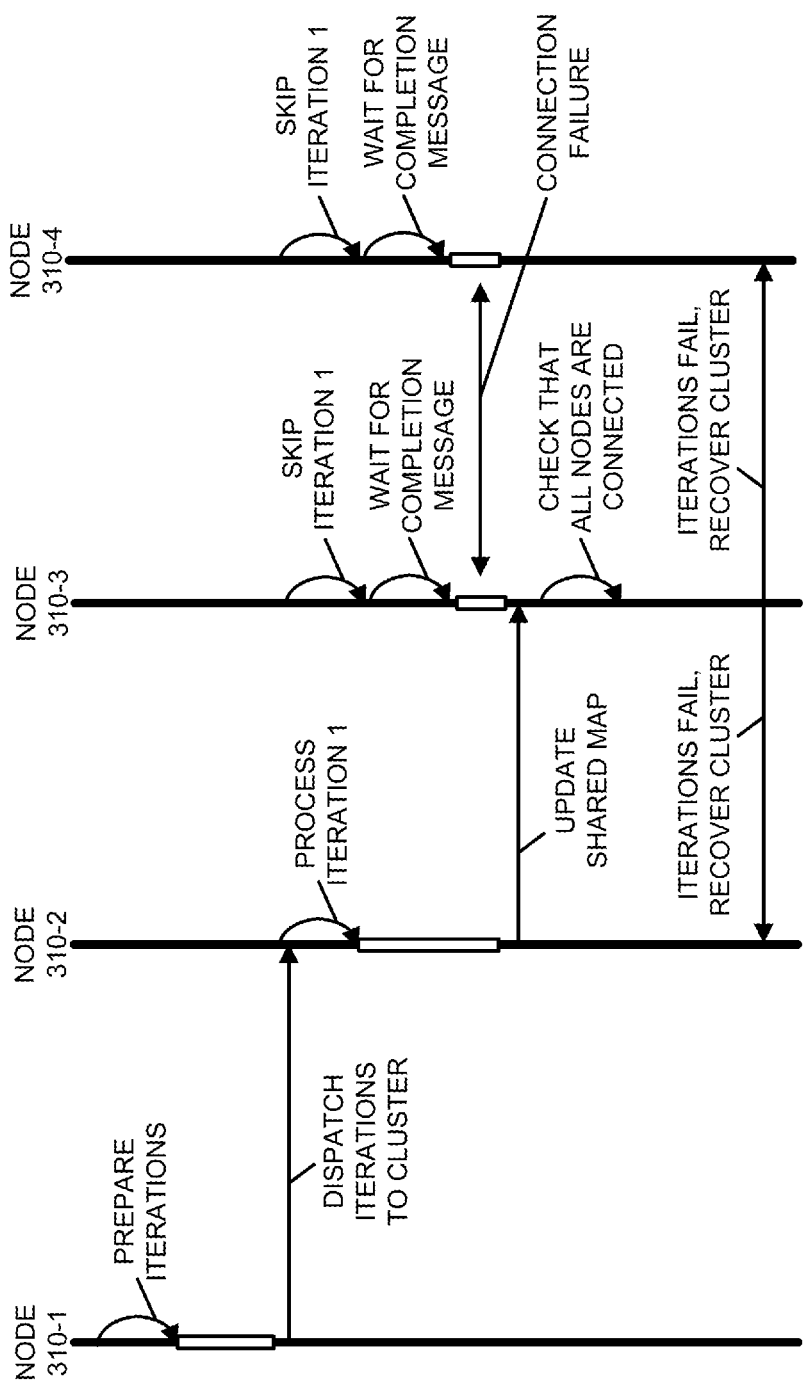
FIG. 7 is a drawing illustrating an example of communication between nodes in a computer system in FIG. 1 in accordance with an embodiment of the present disclosure.

In some embodiments, node 310-2 may be able to update the success state to the leader node (such as node 310-3). However, node 310-3 and node 310-4 may not be connected, which may result in the recovery operation. This is shown in FIG. 7, which presents a drawing illustrating an example of communication between nodes 310 in computer system 112. Notably, the leader node (such as node 310-2) may send recovery information nodes 310.

Figure 8:
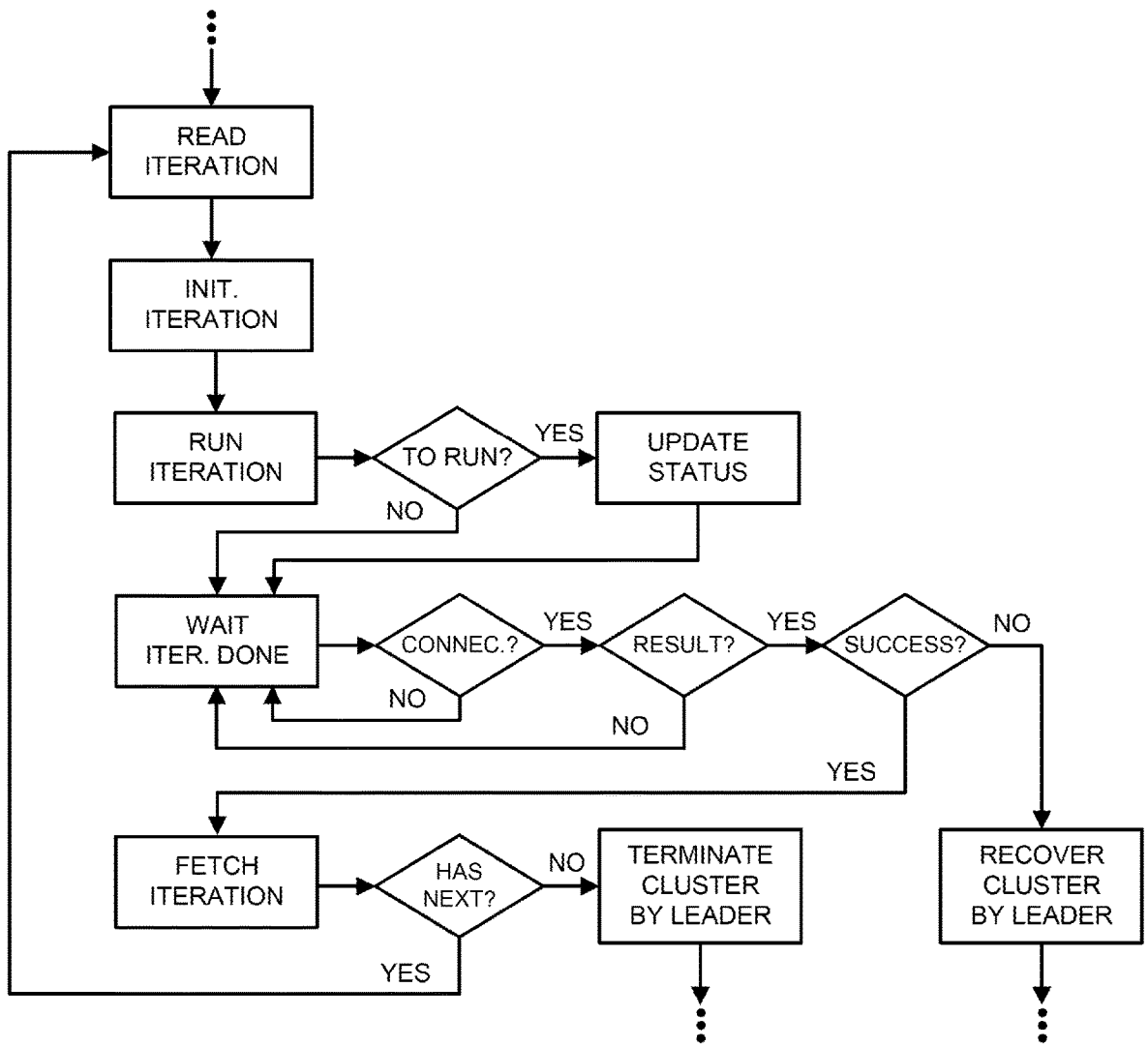
FIG. 8 is a flow diagram illustrating an example of a method for updating controller software using multiple nodes in a computer system in FIG. 1 in accordance with an embodiment of the present disclosure.

FIG. 8 presents a flow diagram illustrating an example of a method 800 for updating controller software using multiple nodes in a computer system, such as computer system 112 (FIG. 1).

The recovery operation may include: using the latest backup file to restore the cluster; avoiding dependency on the current image (e.g., an upgrade agent may send a fail event directly without the assistance of a configure); when an update failure occurs, a restore flag file may be saved; and/or an indication may be provided via a user interface.

Figure 9:
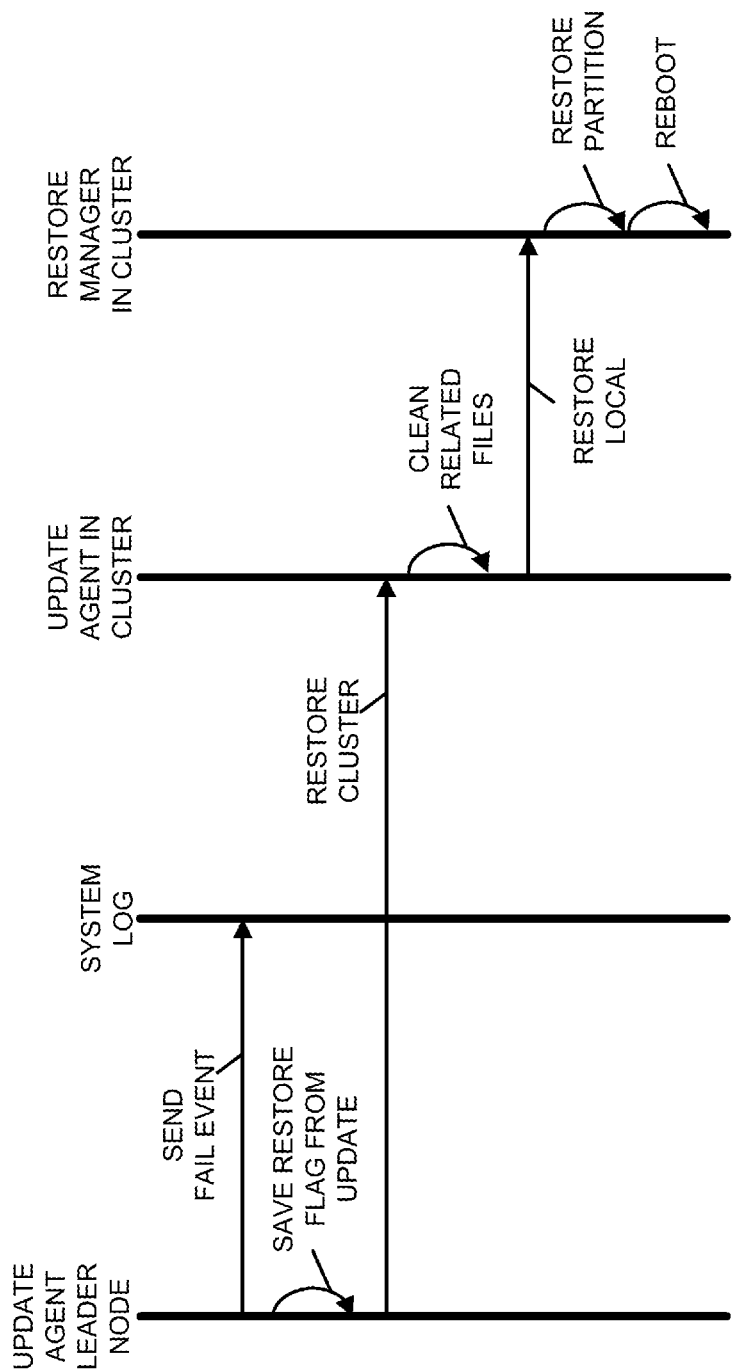
FIG. 9 is a drawing illustrating an example of communication between nodes in a computer system in FIG. 1 in accordance with an embodiment of the present disclosure.

The recovery operation is shown in FIG. 9, which presents a drawing illustrating an example of communication between nodes in computer system 112. Notably, an update agent in a given node may process the update flow. Moreover, the leader node may send update information to other nodes, where the update agents handle the restoring operation.

Figure 10:
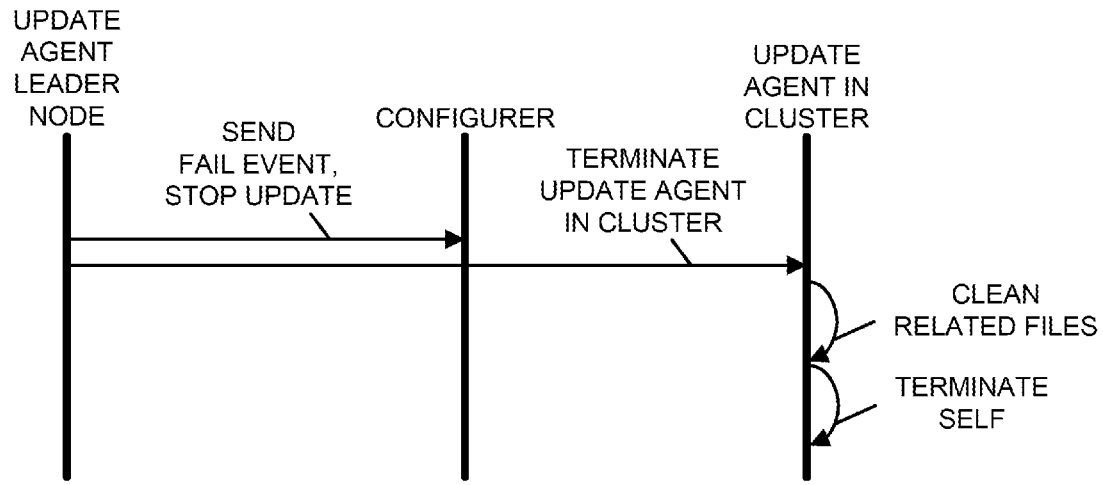
FIG. 10 is a drawing illustrating an example of communication between nodes in a computer system in FIG. 1 in accordance with an embodiment of the present disclosure.

The stop operation may: depend on a new image of the controller software; send an update fail event via, e.g., a Java management extension (JMX) call; and/or may be indicated using a user interface. This is shown in FIG. 10, which presents a drawing illustrating an example of communication between nodes in computer system 112.

Figure 11:
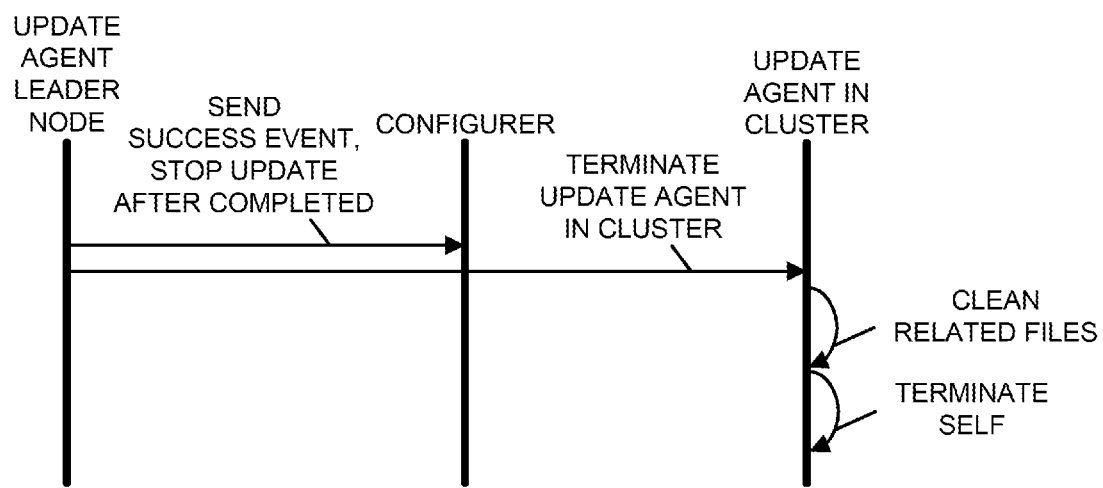
FIG. 11 is a drawing illustrating an example of communication between nodes in a computer system in FIG. 1 in accordance with an embodiment of the present disclosure.

Successful completion of the update to the controller software may result in a success event being communication, e.g., via a Java management extension call. This is shown in FIG. 11, which presents a drawing illustrating an example of communication between nodes in computer system 112. Note that after a successful update, the post-update operation may include eliminating or deactivating the agents in the nodes.

Figure 14:
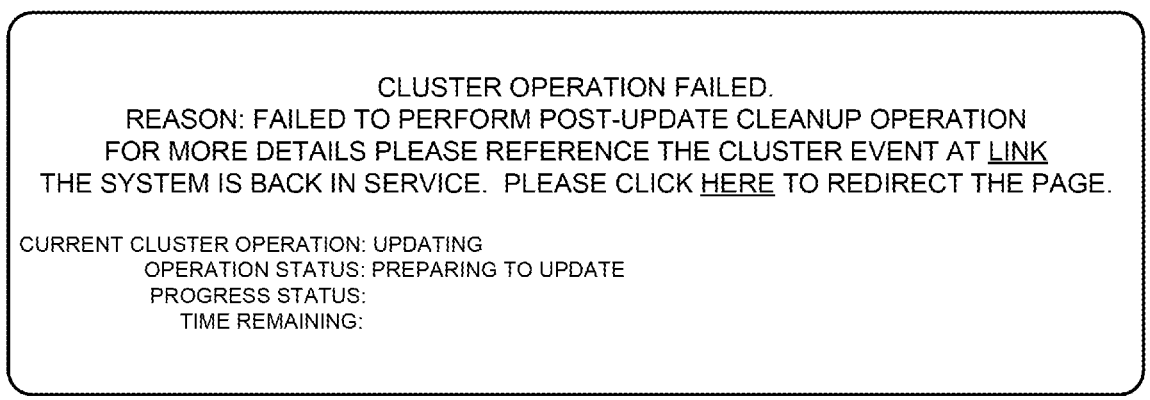
FIG. 14 is a drawing illustrating an example of a user interface in accordance with an embodiment of the present disclosure.

A user interface may be used to update a user regarding an update status. For example, when the computer system recovers following a failure, a user interface may present an indication or a notification to a user. Alternatively or additionally, status information may be maintained in an update history table. In some embodiments, update history table may include information specifying update failures and recovery information. FIGS. 12-14 are drawings illustrating examples of user interfaces with update status information. Notably, FIGS. 12-14 show update status information associated with a recovery or restore operation.

We now describe embodiments of an electronic device, which may perform at least some of the operations in the update techniques. FIG. 15 presents a block diagram illustrating an example of an electronic device 1500 in accordance with some embodiments, such as one of: base station 108, one of electronic devices 110, computer system 112, one of access points 116, one of radio nodes 118, computer network device 128 or computer 130. This electronic device includes processing subsystem 1510, memory subsystem 1512, and networking subsystem 1514. Processing subsystem 1510 includes one or more devices configured to perform computational operations. For example, processing subsystem 1510 can include one or more microprocessors, graphics processing units (GPUs), ASICs, microcontrollers, programmable-logic devices, and/or one or more digital signal processors (DSPs).

Memory subsystem 1512 includes one or more devices for storing data and/or instructions for processing subsystem 1510 and networking subsystem 1514. For example, memory subsystem 1512 can include DRAM, static random access memory (SRAM), and/or other types of memory. In some embodiments, instructions for processing subsystem 1510 in memory subsystem 1512 include: one or more program modules or sets of instructions (such as program instructions 1522 or operating system 1524, such as Linux, UNIX, Windows Server, or another customized and proprietary operating system), which may be executed by processing subsystem 1510. Note that the one or more computer programs, program modules or instructions may constitute a computer-program mechanism. Moreover, instructions in the various modules in memory subsystem 1512 may be implemented in: a high-level procedural language, an object-oriented programming language, and/or in an assembly or machine language. Furthermore, the programming language may be compiled or interpreted, e.g., configurable or configured (which may be used interchangeably in this discussion), to be executed by processing subsystem 1510.

In addition, memory subsystem 1512 can include mechanisms for controlling access to the memory. In some embodiments, memory subsystem 1512 includes a memory hierarchy that comprises one or more caches coupled to a memory in electronic device 1500. In some of these embodiments, one or more of the caches is located in processing sub system 1510.

In some embodiments, memory subsystem 1512 is coupled to one or more high-capacity mass-storage devices (not shown). For example, memory subsystem 1512 can be coupled to a magnetic or optical drive, a solid-state drive, or another type of mass-storage device. In these embodiments, memory subsystem 1512 can be used by electronic device 1500 as fast-access storage for often-used data, while the mass-storage device is used to store less frequently used data.

Networking subsystem 1514 includes one or more devices configured to couple to and communicate on a wired and/or wireless network (i.e., to perform network operations), including: control logic 1516, an interface circuit 1518 and one or more antennas 1520 (or antenna elements). (While FIG. 15 includes one or more antennas 1520, in some embodiments electronic device 1500 includes one or more nodes, such as antenna nodes 1508, e.g., a metal pad or a connector, which can be coupled to the one or more antennas 1520, or nodes 1506, which can be coupled to a wired or optical connection or link. Thus, electronic device 1500 may or may not include the one or more antennas 1520. Note that the one or more nodes 1506 and/or antenna nodes 1508 may constitute input(s) to and/or output(s) from electronic device

1500.) For example, networking subsystem 1514 can include a Bluetooth networking system, a cellular networking system (e.g., a 3G/4G/5G network such as UMTS, LTE, etc.), a universal serial bus (USB) networking system, a coaxial interface, a High-Definition Multimedia Interface (HDMI) interface, a networking system based on the standards described in IEEE 802.11 (e.g., a Wi-Fi® networking system), an Ethernet networking system, and/or another networking system.

Note that a transmit or receive antenna pattern (or antenna radiation pattern) of electronic device 1500 may be adapted or changed using pattern shapers (such as directors or reflectors) and/or one or more antennas 1520 (or antenna elements), which can be independently and selectively electrically coupled to ground to steer the transmit antenna pattern in different directions. Thus, if one or more antennas 1520 include N antenna pattern shapers, the one or more antennas may have $2^N$ different antenna pattern configurations. More generally, a given antenna pattern may include amplitudes and/or phases of signals that specify a direction of the main or primary lobe of the given antenna pattern, as well as so-called 'exclusion regions' or 'exclusion zones' (which are sometimes referred to as 'notches' or 'nulls'). Note that an exclusion zone of the given antenna pattern includes a low-intensity region of the given antenna pattern. While the intensity is not necessarily zero in the exclusion zone, it may be below a threshold, such as 3 dB or lower than the peak gain of the given antenna pattern. Thus, the given antenna pattern may include a local maximum (e.g., a primary beam) that directs gain in the direction of electronic device 1500 that is of interest, and one or more local minima that reduce gain in the direction of other electronic devices that are not of interest. In this way, the given antenna pattern may be selected so that communication that is undesirable (such as with the other electronic devices) is avoided to reduce or eliminate adverse effects, such as interference or crosstalk.

Networking subsystem 1514 includes processors, controllers, radios/antennas, sockets/plugs, and/or other devices used for coupling to, communicating on, and handling data and events for each supported networking system. Note that mechanisms used for coupling to, communicating on, and handling data and events on the network for each network system are sometimes collectively referred to as a 'network interface' for the network system. Moreover, in some embodiments a 'network' or a 'connection' between the electronic devices does not yet exist. Therefore, electronic device 1500 may use the mechanisms in networking subsystem 1514 for performing simple wireless communication between the electronic devices, e.g., transmitting advertising or beacon frames and/or scanning for advertising frames transmitted by other electronic devices as described previously.

Within electronic device 1500, processing subsystem 1510, memory subsystem 1512, and networking subsystem 1514 are coupled together using bus 1528. Bus 1528 may include an electrical, optical, and/or electro-optical connection that the subsystems can use to communicate commands and data among one another. Although only one bus 1528 is shown for clarity, different embodiments can include a different number or configuration of electrical, optical, and/or electro-optical connections among the subsystems.

In some embodiments, electronic device 1500 includes a display subsystem 1526 for displaying information on a display, which may include a display driver and the display, such as a liquid-crystal display, a multi-touch touchscreen, etc.

Moreover, electronic device 1500 may include a user-interface subsystem 1530, such as: a mouse, a keyboard, a trackpad, a stylus, a voice-recognition interface, and/or another human-machine interface. In some embodiments, user-interface subsystem 1530 may include or may interact with a touch-sensitive display in display subsystem 1526.

Electronic device 1500 can be (or can be included in) any electronic device with at least one network interface. For example, electronic device 1500 can be (or can be included in): a desktop computer, a laptop computer, a subnotebook/netbook, a server, a tablet computer, a cloud-based computing system, a smartphone, a cellular telephone, a smartwatch, a wearable electronic device, a consumer-electronic device, a portable computing device, an access point, a transceiver, a router, a switch, communication equipment, an eNodeB, a controller, test equipment, and/or another electronic device.

Although specific components are used to describe electronic device 1500, in alternative embodiments, different components and/or subsystems may be present in electronic device 1500. For example, electronic device 1500 may include one or more additional processing subsystems, memory subsystems, networking subsystems, and/or display subsystems. Additionally, one or more of the subsystems may not be present in electronic device 1500. Moreover, in some embodiments, electronic device 1500 may include one or more additional subsystems that are not shown in FIG. 15. Also, although separate subsystems are shown in FIG. 15, in some embodiments some or all of a given subsystem or component can be integrated into one or more of the other subsystems or component(s) in electronic device 1500. For example, in some embodiments instructions 1522 is included in operating system 1524 and/or control logic 1516 is included in interface circuit 1518.

Moreover, the circuits and components in electronic device 1500 may be implemented using any combination of analog and/or digital circuitry, including: bipolar, PMOS and/or NMOS gates or transistors. Furthermore, signals in these embodiments may include digital signals that have approximately discrete values and/or analog signals that have continuous values. Additionally, components and circuits may be single-ended or differential, and power supplies may be unipolar or bipolar.

An integrated circuit (which is sometimes referred to as a 'communication circuit') may implement some or all of the functionality of networking subsystem 1514 and/or of electronic device 1500. The integrated circuit may include hardware and/or software mechanisms that are used for transmitting wireless signals from electronic device 1500 and receiving signals at electronic device 1500 from other electronic devices. Aside from the mechanisms herein described, radios are generally known in the art and hence are not described in detail. In general, networking subsystem 1514 and/or the integrated circuit can include any number of radios. Note that the radios in multiple-radio embodiments function in a similar way to the described single-radio embodiments.

In some embodiments, networking subsystem 1514 and/or the integrated circuit include a configuration mechanism (such as one or more hardware and/or software mechanisms) that configures the radio(s) to transmit and/or receive on a given communication channel (e.g., a given carrier frequency). For example, in some embodiments, the configuration mechanism can be used to switch the radio from monitoring and/or transmitting on a given communication channel to monitoring and/or transmitting on a different communication channel. (Note that 'monitoring' as used herein comprises receiving signals from other electronic devices and possibly performing one or more processing operations on the received signals)

In some embodiments, an output of a process for designing the integrated circuit, or a portion of the integrated circuit, which includes one or more of the circuits described herein may be a computer-readable medium such as, for example, a magnetic tape or an optical or magnetic disk. The computer-readable medium may be encoded with data structures or other information describing circuitry that may be physically instantiated as the integrated circuit or the portion of the integrated circuit. Although various formats may be used for such encoding, these data structures are commonly written in: Caltech Intermediate Format (CIF), Calma GDS II Stream Format (GDSII) or Electronic Design Interchange Format (EDIF), OpenAccess (OA), or Open Artwork System Interchange Standard (OASIS). Those of skill in the art of integrated circuit design can develop such data structures from schematics of the type detailed above and the corresponding descriptions and encode the data structures on the computer-readable medium. Those of skill in the art of integrated circuit fabrication can use such encoded data to fabricate integrated circuits that include one or more of the circuits described herein.

While the preceding discussion used Wi-Fi and/or Ethernet communication protocols as illustrative examples, in other embodiments a wide variety of communication protocols and, more generally, communication techniques may be used. Thus, the update techniques may be used in a variety of network interfaces. Furthermore, while some of the operations in the preceding embodiments were implemented in hardware or software, in general the operations in the preceding embodiments can be implemented in a wide variety of configurations and architectures. Therefore, some or all of the operations in the preceding embodiments may be performed in hardware, in software or both. For example, at least some of the operations in the update techniques may be implemented using program instructions 1522, operating system 1524 (such as a driver for interface circuit 1518) or in firmware in interface circuit 1518. Alternatively or additionally, at least some of the operations in the update techniques may be implemented in a physical layer, such as hardware in interface circuit 1518.

Note that the use of the phrases 'capable of,' 'capable to,' 'operable to,' or 'configured to' in one or more embodiments, refers to some apparatus, logic, hardware, and/or element designed in such a way to enable use of the apparatus, logic, hardware, and/or element in a specified manner.

While examples of numerical values are provided in the preceding discussion, in other embodiments different numerical values are used. Consequently, the numerical values provided are not intended to be limiting.

In the preceding description, we refer to 'some embodiments.' Note that 'some embodiments' describes a subset of all of the possible embodiments, but does not always specify the same subset of embodiments.

The foregoing description is intended to enable any person skilled in the art to make and use the disclosure, and is provided in the context of a particular application and its requirements. Moreover, the foregoing descriptions of embodiments of the present disclosure have been presented for purposes of illustration and description only. They are not intended to be exhaustive or to limit the present disclosure to the forms disclosed. Accordingly, many modifications and variations will be apparent to practitioners skilled in the art, and the general principles defined herein may be applied to other embodiments and applications without departing from the spirit and scope of the present disclosure. Additionally, the discussion of the preceding embodiments is not intended to limit the present disclosure. Thus, the present disclosure is not intended to be limited to the embodiments shown, but is to be accorded the widest scope consistent with the principles and features disclosed herein.

What is claimed is:

1. A computer system, comprising:
multiple nodes in a cluster, wherein the computer system is configured to:
provide, from a controller node in the multiple nodes, a set of operations to the multiple nodes, wherein the set of operations are associated with an update of controller software for a controller of a network, and wherein at least the controller node implements the controller;
perform, by at least a first node in the multiple nodes, the set of operations associated with the update of the controller software;
monitor, by at least a second node in the multiple nodes, the performing of the set of operations by at least the first node;
when the performing of the set of operations is completed by at least the first node, terminate, by the first node, the performing of the set of operations by the multiple nodes; and
when a failure occurs during the update of the controller software, automatically recover, by at least the first node or the second node, the multiple nodes.

2. The computer system of claim 1, wherein the multiple nodes are configured to independently perform at least an operation in the set of operations; and
wherein the multiple nodes are configured to sequentially perform at least the operation or concurrently perform at least the operation.

3. The computer system of claim 1, wherein the first node is configured to operate as a leader node in the multiple nodes; and
wherein the leader node automatically performs the recovering when the failure occurs.

4. The computer system of claim 1, wherein the second node is configured to operate as a leader node; and
wherein the leader node automatically performs the recovering when the failure occurs.

5. The computer system of claim 1, wherein the computer system comprises multiple groups of nodes and a given group of nodes has an associated instance of a leader node configured to automatically perform the recovering of the given group when the failure occurs.

6. The computer system of claim 1, wherein the monitoring comprises receiving, from at least the first node, a completion message when a given operation in the set of operations is completed; and
wherein, when the completion message is received, at least the second node is configured to skip performing the given operation in the set of operations.

7. The computer system of claim 1, wherein at least the second node does not receive a completion message associated with a given operation in the set of operations from the first node within a predefined time interval, at least the second node is configured to:
terminate the performing of the set of operations by the multiple nodes; and
automatically recover the multiple nodes.

8. The computer system of claim 7, wherein the completion message is not received within the predefined time interval when there is a network failure.

9. The computer system of claim 8, wherein, when there is a network failure, at least the first node and the second node are configured to automatically recover the multiple nodes.

10. The computer system of claim 1, wherein, when a given operation in the set of operations performed by the first node fails, the first node is configured to notify at least the second node;
wherein the second node is configured to skip performing operations following the given operation in the set of operations based at least in part on the notification; and
wherein the first node is configured to automatically recover the multiple nodes.

11. The computer system of claim 1, wherein the recovering comprises: installing a backup image of the controller software on the multiple nodes; and restoring operation of the multiple nodes.

12. The computer system of claim 1, wherein, when the second node determines that a connection with a third node in the multiple nodes is unavailable when the first node is performing the set of operations, the second node is configured to terminate the performing of the set of operations by the multiple nodes; and
wherein, after the second node terminates the performing of the set of operations by the multiple nodes, at least the first node is configured to automatically recover the multiple nodes.

13. The computer system of claim 1, wherein the set of operations comprises: preparing the update; migrating a database; preparing the computer system for the update; upgrading the computer system; and performing post-update operations.

14. A non-transitory computer-readable storage medium for use in conjunction with a computer system that comprises multiple nodes, the computer-readable storage medium storing program instructions that, when executed by the computer system, cause the computer system to perform operations comprising:
provide, from a controller node in the multiple nodes, a set of operations to the multiple nodes, wherein the set of operations are associated with an update of controller software for a controller of a network, and wherein at least the controller node implements the controller;
perform, by at least a first node in the multiple nodes, the set of operations associated with the update of the controller software;
monitor, by at least a second node in the multiple nodes, the performing of the set of operations by at least the first node;
when the performing of the set of operations is completed by at least the first node, terminate, by the first node, the performing of the set of operations by the multiple nodes; and
when a failure occurs during the update of the controller software, automatically recover, by at least the first node or the second node, the multiple nodes.

15. The non-transitory computer-readable storage medium of claim 14, wherein the monitoring comprises receiving, from at least the first node, a completion message when a given operation in the set of operations is completed; and
wherein, when the completion message is received, the operations comprise at least the second node skipping performing the given operation in the set of operations.

16. The non-transitory computer-readable storage medium of claim 14, wherein at least the second node does not receive a completion message associated with a given operation in the set of operations from the first node within a predefined time interval, the operations comprise at least the second node:
terminating the performing of the set of operations by the multiple nodes; and
automatically recovering the multiple nodes.

17. A method for performing an update of controller software, comprising:
by a computer system comprising multiple nodes:
provide, from a controller node in the multiple nodes, a set of operations to the multiple nodes, wherein the set of operations are associated with the update of the controller software for a controller of a network, and wherein at least the controller node implements the controller;
perform, by at least a first node in the multiple nodes, the set of operations associated with the update of the controller software;
monitor, by at least a second node in the multiple nodes, the performing of the set of operations by at least the first node;
when the performing of the set of operations is completed by at least the first node, terminate, by the first node, the performing of the set of operations by the multiple nodes; and
when a failure occurs during the update of the controller software, automatically recover, by at least the first node or the second node, the multiple nodes.

18. The method of claim 17, wherein the monitoring comprises receiving, from at least the first node, a completion message when a given operation in the set of operations is completed; and
wherein, when the completion message is received, the method comprises at least the second node skipping performing the given operation in the set of operations.

19. The method of claim 17, wherein the first node or the second node comprises a leader node in the multiple nodes; and
wherein, when the failure occurs, the leader node automatically performs the recovering.

20. The method of claim 17, wherein at least the second node does not receive a completion message associated with a given operation in the set of operations from the first node within a predefined time interval, the method comprises at least the second node:
terminating the performing of the set of operations by the multiple nodes; and
automatically recovering the multiple nodes.

* * * * *